United States Patent [19]

Stumpe

[11] 4,436,347
[45] Mar. 13, 1984

[54] PRESSURE MEDIUM BRAKE SYSTEM HAVING A DUAL-VALVE CONTROL

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 411,140

[22] Filed: Aug. 24, 1982

[30] Foreign Application Priority Data

Feb. 6, 1982 [DE] Fed. Rep. of Germany ....... 3204185

[51] Int. Cl.³ .............................................. B60T 15/18
[52] U.S. Cl. .................................... 303/6 R; 303/15; 303/52
[58] Field of Search ....................... 303/15–17, 303/13, 14, 2, 3, 6, 7–9, 20, DIG. 1, DIG. 2, 28–30, 40, 50–56; 188/3, 151 A

[56] References Cited

U.S. PATENT DOCUMENTS

| | | | |
|---|---|---|---|
| 3,982,795 | 9/1976 | Grüner | 303/52 |
| 4,002,373 | 1/1977 | Mori | 303/52 X |
| 4,161,341 | 7/1979 | Reinecke et al. | 303/52 |

FOREIGN PATENT DOCUMENTS

| | | | |
|---|---|---|---|
| 1555556 | 3/1972 | Fed. Rep. of Germany. | |
| 2420752 | 2/1975 | Fed. Rep. of Germany | 303/13 |

*Primary Examiner*—Douglas C. Butler
*Attorney, Agent, or Firm*—Edwin E. Greigg

[57] ABSTRACT

A pressure-medium brake system with division into two or more brake circuits is proposed. A relay valve is incorporated into each brake circuit. Control medium and working medium of each relay valve are supplied by the same pressure-medium source. For each brake circuit a single valve is provided in a service brake valve, which additionally has an electrical supply, with which the actuation of all relay valves can be controlled. The pressure-medium brake system is preferably embodied as an air-brake system and is intended for utility vehicles, such as trucks and buses.

4 Claims, 1 Drawing Figure

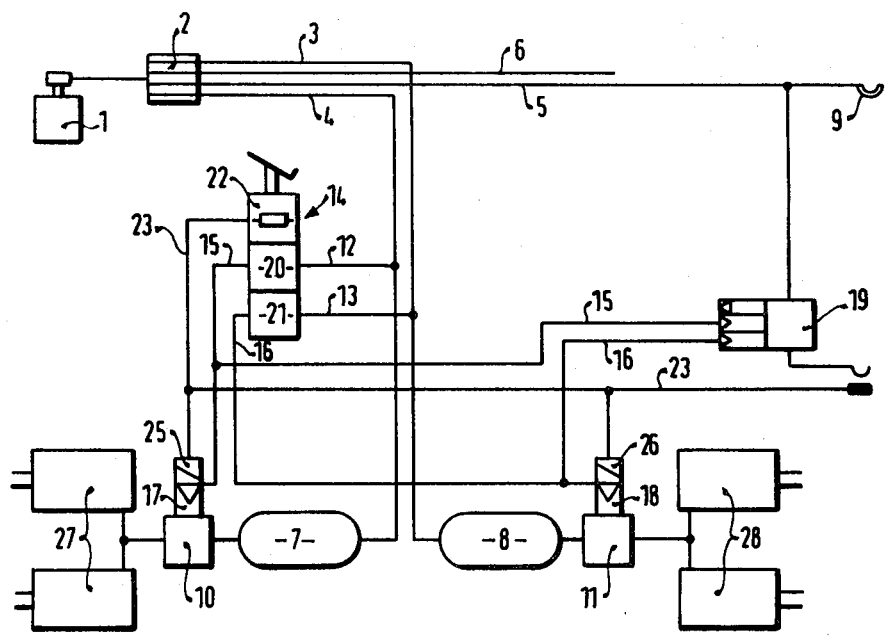

PRESSURE MEDIUM BRAKE SYSTEM HAVING A DUAL-VALVE CONTROL

BACKGROUND OF THE INVENTION

The present invention is based on a pressure-medium brake system. Such a brake system is known (German Patent Application W 10 827).

In such a known brake system the relay valve can only be controlled in a single circuit. This can lead to a loss of braking power in case of a defect in the control circuit.

OBJECT AND SUMMARY OF THE INVENTION

In contrast to the foregoing, the pressure-medium brake system disclosed in this application has the advantage that in case of loss of one control circuit the other intact control circuit(s) can still control the relay valve. The safety of the brake system is thus enhanced in this manner.

There is the additional advantage that by use of the present invention a so-called "overlapping" control is possible, which leads to a further safety of the brake system because of the reciprocal control of the relay valves of several brake circuits.

Finally, it is possible to form all relay valves of the system in the same manner. This makes possible a considerable savings.

The invention will be better understood and further objects and advantages thereof will become more apparent from the ensuing detailed description of a preferred embodiment taken in conjunction with the drawings.

BRIEF DESCRIPTION OF THE DRAWING

The single FIGURE of the drawing shows a preferred embodiment of the present invention which is explained in greater detail in the following description.

DESCRIPTION OF THE PREFERRED EMBODIMENT

A dual-circuit air brake system is equipped with a compressor 1 and a quadruple-circuit safety valve 2, which is placed subsequent to the former. Four supply lines 3, 4, 5, 6 start at the quadruple-circuit safety valve 2, two of which (3, 4) lead to tractor supply tanks 7, 8, one (5) to a supply coupling head 9 for a trailer, and one (6) to a subsidiary consumer not shown. Both supply tanks 7 and 8 are designated pressure-medium sources in the following disclosure.

Each pressure-medium source 7 and 8 is followed by an electrically or pneumatically operated relay valve 10 or 11, which are under pressure from the pressure-medium source 7 or 8 such a dually operated valve has been set forth in German patent No. 1,555,556. Since the electrical system is faster, the valve will be opened electrically. If the electrical system fails, then the pneumatic system operates the valve. Therefore the dually operated valves 10 and 11 are safety valves having a back-up system for operation. From each supply line 3 or 4 a branch line 12 or 13 leads to a multi-circuit service brake valve 14, which can direct a control medium to each control line 15 or 16 via a single valve 20 or 21. The control line 15 is connected to the relay valve 10, and the control line 16 to the relay valve 11. There the control line 15 or 16 leads into a control chamber 17 or 18 respectively. The control line 15, 16 furthermore runs to a control valve 19 of the trailer, the control of which, however, is of no importance in this application.

The multi-circuit brake valve 14 additionally has an electric supply 22, besides the two single valves 20 and 21, by means of which, via an electrical line 23, an electro-magnet 25 or 26, as well as an electrical line 23 of the trailer can be controlled.

Each of the two electro-magnets 25 or 26 is disposed on one of the two relay valves 10 or 11 in such a manner that it can operate the relay valve 10 or 11 as well as the control by way of the control chamber 17 or 18.

In this manner an electrical actuation of the relay valves 10 and 11, overlapping both brake circuits, has been accomplished, which precedes the actuation by the pressure medium.

Following each relay valve 10 or 11 a pair of brake cylinders 27 or 28 is disposed, one of which (27) is employed for the front wheels, the other (28) for the rear wheels of a motor vehicle.

Mode of Operation

When actuating the multi-circuit service brake valve 14, first the electric supply 22 is switched on, so that via the electrical line 23, overlapping the brake circuits, both electro-magnets 25 and 26 of the relay valves 10 and 11 and the line 23 of the trailer are supplied with current and the relay valves 10 and 11 are switched over. From each of the pressure-medium sources 7 or 8 working pressure medium then reaches the brake cylinders 27 and 28 shortly.

Shortly thereafter both single valves 20 and 21 in the service brake valve 14 are also actuated, so that the control chambers 17 and 18, too, are supplied with control pressure medium. Only during the loss of the electrical control do the control chambers 17 and 18 cause the switch-over of the relay valves 10 and 11.

In this manner the brake system is to a large degree fail-safe. Furthermore, multi-circuitry is achieved. Finally, both relay valves 10 and 11 are identical in their construction.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A pressure-medium brake system for vehicles having at least two brake circuits, each of said brake circuits having its own source of pressure-medium, and each having one relay valve, said brake circuits controlled by a multi-circuit service brake valve, said multi-circuit service brake valve being in a line extending to control chambers associated with each of said relay valves, said control chambers arranged to control a braking medium, characterized in that said sources of pressure medium supplies a control for each of said relay valves and a working medium for actuation of the brake circuit and further that an electrical supply means for additional control of said relay valves is provided at said multi-circuit service brake valve.

2. A pressure-medium brake system in accordance with claim 1, characterized in that each of said relay valves can be selectively controlled by either said pressure medium or by said electrical supply means.

3. A pressure-medium brake system in accordance with claim 2, characterized in that said electrical supply means further includes a control means that provides for an override for all brake circuits.

4. A pressure-medium brake system in accordance with claim 1, characterized in that said electrical supply means further includes a control means that provides for an override for all brake circuits.

* * * * *